United States Patent

Beaverson et al.

Patent Number: 5,860,133
Date of Patent: Jan. 12, 1999

[54] METHOD FOR ALTERING MEMORY CONFIGURATION AND SIZING MEMORY MODULES WHILE MAINTAINING SOFTWARE CODE STREAM COHERENCE

[75] Inventors: Arthur J. Beaverson, Boxboro; Stephen Francis Shirron, Acton; Harold Canute Buckingham, III, Marlborough, all of Mass.

[73] Assignee: Digital Equipment Corporation, Maynard, Mass.

[21] Appl. No.: 565,751

[22] Filed: Dec. 1, 1995

[51] Int. Cl.$^6$ .......................................... G06F 12/00

[52] U.S. Cl. .................. 711/171; 711/170; 711/161; 711/165; 711/217

[58] Field of Search ..................... 395/405, 402, 395/497.01, 497.02, 419; 711/202, 5, 170, 171, 209

[56] References Cited

U.S. PATENT DOCUMENTS

| | | | |
|---|---|---|---|
| 4,254,463 | 3/1981 | Busby et al. | 395/405 |
| 4,617,624 | 10/1986 | Goodman | 395/402 |
| 4,754,394 | 6/1988 | Brantley, Jr. et al. | 395/405 |
| 5,067,105 | 11/1991 | Borkenhagen et al. | 711/202 |
| 5,341,486 | 8/1994 | Castle | 395/405 |
| 5,377,340 | 12/1994 | Seroussi et al. | 395/405 |
| 5,463,589 | 10/1995 | Gruender, Jr. et al. | 711/5 |
| 5,535,368 | 7/1996 | Ho et al. | 711/170 |

*Primary Examiner*—Tod R. Swann
*Assistant Examiner*—Fred F. Tzeng
*Attorney, Agent, or Firm*—Anne E. Saturnelli

[57] ABSTRACT

A memory of a computer system is sized and configured after the memory has been loaded with data. The sizing and configuration of the memory causes the data to become scattered among memory chips on a single memory module or among two or more memory modules. To gather the data, gather code loads itself into the instruction cache of the computer system and while executing from the instruction cache configures the memory and gathers the data in the memory such that it is again located at the same address it held before the configuration occurred.

12 Claims, 5 Drawing Sheets

FIG. 2

```
              CC                                    CC
      16a 16b 16c 16d                       18a 18b 18c 18d
       00  01  10  11  ⎫                     00  01  10  11  ⎫
       ⎫   ⎫   ⎫   ⎫   ⎬ 16                  ⎫   ⎫   ⎫   ⎫   ⎬ 18
   000 | H | E | L | L |                 100 | A | R | E |   |
bRR 001 | O |   | W | O |             bRR 101 | Y | O | U | ? |
   010 | R | L | D |   |                 110 | - | - | - | - |
   011 | H | O | W |   |                 111 | - | - | - | - |
```

C - COLUMN SELECT  
R - ROW SELECT  
b - BOARD SELECT

FIG. 3

```
                           CCb
       16a  18a  16b  18b  16c  18c  16d  18d
       000) 001) 010) 011) 100) 101) 110) 111)
    00 | H | A | E | R | L | E | L |   |
RR  01 | O | Y |   | O | W | U | O | ? |
    10 | R | - | L | - | D | - | - | - |
    11 | H | - | O | - | W | - | - | - |
```

C - COLUMN SELECT  
R - ROW SELECT  
b - BOARD SELECT

FIG. 4

```
                           CCb
       16a  18a  16b  18b  16c  18c  16d  18d
       000) 001) 010) 011) 100) 101) 110) 111)
    00 | H | E | L | L | O |   | W | O |
RR  01 | R | L | D |   | H | O | W |   |
    10 | A | R | E |   | Y | O | U | ? |
    11 | - | - | - |   | - | - | - | - |
       16a" 18a" 16b" 18b"
```

C - COLUMN SELECT  
R - ROW SELECT  
b - BOARD SELECT

5,860,133

METHOD FOR ALTERING MEMORY CONFIGURATION AND SIZING MEMORY MODULES WHILE MAINTAINING SOFTWARE CODE STREAM COHERENCE

BACKGROUND OF THE INVENTION

This invention relates generally to the configuration of memory within a computer system and more particularly to maintaining the integrity of data stored within the memory prior to configuration once configuration of the memory is completed.

As is known in the art, a memory configuration is typically performed before the computer system has stored any information in memory. By performing the configuration before memory is used, there is no danger of readdressing the data in memory and thus making it difficult if not impossible to access.

Memory configuration is usually performed before the memory is used during initialization of the computer system. Typically, the software used to perform the configuration is stored in and executed from the Read Only Memory (ROM) or it is loaded into cache and executed before any information is stored in the memory itself. In this way, the memory configuration does not readdress the data stored in memory thus making it impossible to access under the new configuration without causing an error condition.

As computer systems have become more complex and the memory configuration and initialization software has become correspondingly more complex however, the cache memory within computer systems is too small to fit all of the software needed to perform the configuration and initialization. As a result other solutions have had to be addressed which permit these lengthy and complex software solutions to be stored and executed to effectuate the configuration of memory as well as the initialization of the computer system. What is needed is a solution which will allow the memory of the system to be used in a simple configuration to store the initialization and reconfiguration software prior to the memory being reconfigured to the final and more complex configuration.

SUMMARY OF THE INVENTION

In accordance with the present invention, a method for configuring a memory of a computer system, while maintaining data integrity, includes the steps of, loading data into the memory using a first addressing scheme, determining a memory configuration of the computer system, reconfiguring the memory in accordance with the memory configuration which provides a second memory addressing scheme, determining a location of the data using the second memory addressing scheme and relocating the data in the memory at a location using the second addressing scheme corresponding to an address of the location of the data using the first addressing scheme. With such an arrangement, a computer memory may be reconfigured during operation of the computer system, after it has been loaded with data without danger of corrupting the data stored within the memory.

In accordance with a further aspect of the invention, a method for reconfiguring a memory of a computer system during initialization of the computer system, while maintaining software code stream coherence, includes the steps of providing a limited initialization of the computer system including a first configuration of memory which provides a first memory addressing scheme, loading console firmware into the memory of the computer system, executing the console firmware, loading gather code into an instruction cache of the computer system, and executing the gather code. The step of executing the gather code further includes the steps of reconfiguring the memory in accordance with a second configuration of memory which provides a second memory addressing scheme, and relocating the console firmware in the memory to a location using the second memory addressing scheme which corresponds to an address of a location that the console firmware was stored in the memory using the first memory addressing scheme. With such an arrangement, the memory of the computer system may be used to store initialization software, console firmware, for the computer system before the memory has been fully configured. In this way, the size of console firmware for a computer system is not limited by the size of the Read Only Memory available in the system. In addition, the memory of the system may be configured after the console firmware is stored in and is executing from the memory of the computer system.

BRIEF DESCRIPTION OF THE DRAWINGS

The above-mentioned and other features of the invention will now become more apparent by reference to the following description taken in connection with the accompanying drawings in which:

FIG. 2 is a block diagram of the two memory boards of FIG. 1 before configuration of the computer system memory;

FIG. 3 is block diagram of the two memory boards of FIG. 1 after configuration of the computer system in which two-way memory interleaving has been implemented;

FIG. 4 is a block diagram of the two memory boards of FIG. 1 after the memory interleaving of FIG. 3 has been implemented and the gather code has been executed;

DESCRIPTION OF THE PREFERRED EMBODIMENTS

Figure 1:
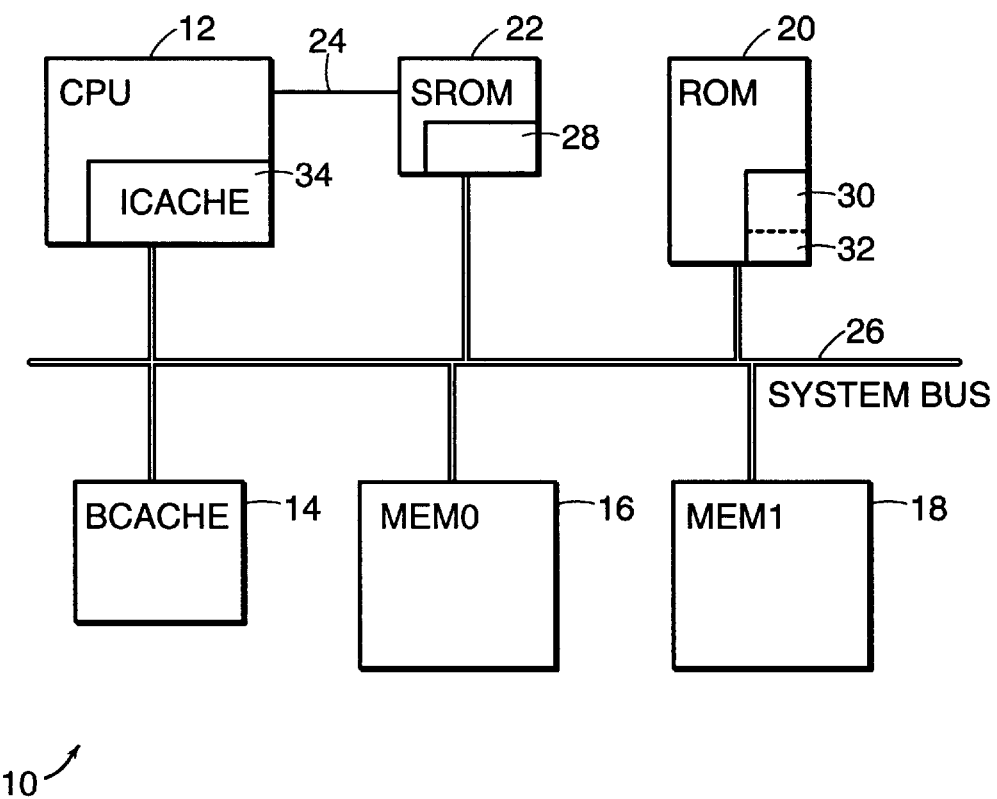
FIG. 1 is a block diagram of a computer system in which the memory is configured during initialization of the computer system.

Referring to FIG. 1, a computer system 10 is shown to include a Central Processing Unit (CPU) 12, backup cache memory (BCACHE) 14, memory modules MEM0 16 and MEM1 18, Read Only Memory (ROM) 20, Serial Read Only Memory (SROM) 22, a serial backdoor bus 24 connecting the SROM 22 and the CPU 12 and a system bus 26. Computer system 10 is also shown to include SROM code 28 which is provided in SROM 22 and console firmware 30 which is provided in ROM 20 and an instruction cache (ICACHE) 34 located on CPU 12. The function of the SROM code 28 and the console firmware 30 will be discussed in detail below. When the computer system 10 is powered on, each component in the computer system 10 is initialized such that each is operating in a known state. In addition, tests may be performed to determine whether each component is operating properly.

The SROM code 28 provided in SROM 22 begins this initialization and testing. The SROM code 28 provides a rudimentary initialization of the CPU 12 and memory 16, 18 as well as the system bus 26 and the serial bus 24 sufficient to load console firmware 30 into the memory 16, 18. That is, if MEM0 16 is of a sufficient size to store all of the console code 30 then only MEM0 16 will be initialized by the SROM code 28 however, if the console firmware 30 is too large to fit entirely into MEM0 16, MEM1 18 will also be initialized by the SROM code 28. The console firmware 30 performs a more extensive initialization of the computer system 10 components, runs diagnostic tools and eventually runs the computer system 10.

When the computer system is powered on, the SROM code 28 is loaded into the ICACHE 34 in the CPU 12 through the backdoor serial bus 24. The serial bus 24 loads the SROM code 28 bit by bit into the ICACHE 34.

Once loaded into the ICACHE 34, the SROM code 28 executes. While executing, the SROM code 28 is unaware of the actual memory configuration of the system. Rather than including the ability to determine the memory configuration into the SROM code 28, which would make it unduly complicated and large and thus unable to fit into the SROM 22, the SROM code 28 makes an assumption as to the memory configuration of the system.

Typically, the assumption made is that a minimal amount of memory is available capable of providing storage for all of the console firmware 30. Here, it is assumed that only MEM0 is available which is also assumed to be composed of 4 MBit DRAM chips. As only one memory board is assumed available, it is accordingly assumed that interleaving has not been implemented. By assuming a minimal amount, the same SROM code 28 may be used in computer systems which include varying amounts of memory. This initial, simple memory configuration will be followed by a final, complex memory reconfiguration.

Assuming only MEM0 16 is available, the SROM code 28 loads the console firmware 30 into MEM0 16. Once the SROM code 28 has loaded the console firmware 30 into memory it terminates execution and transfers control to the console firmware 30 now resident in MEM0 16. The console firmware 30 begins its initialization by determining the memory actually available in the computer system 10. Generally, a computer system includes more than what was assumed available by the SROM code 28 as here, where the computer system 10 actually includes MEM0 16 and MEM1 18.

Once the available memory of the computer system 10 is determined, the memory 16, 18 is reconfigured to reflect what is actually available. That is, if MEM0 16 is actually composed of 16 MBit DRAM chips, the row and column values used to address MEM0 16 will be adjusted appropriately and as MEM1 18 is also available, memory interleaving may be implemented. This reconfiguration cannot be performed by the console firmware 30 as it is resident in MEM0 16 which is to be reconfigured. An attempt to execute the console firmware while the memory 16, 18 is being reconfigured will eventually result in an error condition as the console firmware 30, loaded into MEM0 16 using a first memory addressing scheme, will be unable to locate itself using the new, actual memory addressing scheme which results once the reconfiguration is complete. Rather, a small portion of code included in the console firmware 30, the gather code 32, loads itself into the ICACHE 34, reconfigures the memory 16, 18 of the computer system 10 and relocates the data in memory 16, 18 such that the data will reside at the same memory address after gathering is complete as it did before the reconfiguration was implemented. Once the gather code 32 has reconfigured the memory and has relocated the data in the memory 16, 18, the gather code 32 returns control to the console firmware 30 which is now able to complete execution as its address in memory 16, 18 after reconfiguration corresponds to its address in memory 16, 18 before the reconfiguration commenced.

One skilled in the art of memory configuration should be aware that a configuration of memory and subsequent gathering of data in the memory may be performed at any time during operation of the computer system 10 and not simply after power-up of the computer system 10 as described above.

Referring now to FIG. 2, an example of reconfiguring memory after data has been stored in it is provided in which data corresponding to the phrase "HELLO WORLD HOW ARE YOU?" has been loaded into the cells of MEM0 16 and MEM1 18 prior to a reconfiguration of MEM0 16 and MEM1 18. The address of each of the data cells in MEM0 16 and MEM1 18 under a first memory addressing scheme and the data which is stored in each of the cells is as follows (where C=Column Select, R=Row Select, b=Board Select):

| Bits | Address | Data | Bits | Address | Data |
|---|---|---|---|---|---|
| (bRRCC) | | | (bRRCC) | | |
| 00000 | 0 | H | 10000 | 16 | A |
| 00001 | 1 | E | 10001 | 17 | R |
| 00010 | 2 | L | 10010 | 18 | E |
| 00011 | 3 | L | 10011 | 19 |   |
| 00100 | 4 | O | 10100 | 20 | Y |
| 00101 | 5 |   | 10101 | 21 | O |
| 00110 | 6 | W | 10110 | 22 | U |
| 00111 | 7 | O | 10111 | 23 | ? |
| 01000 | 8 | R | 11000 | 24 | — |
| 01001 | 9 | L | 11001 | 25 | — |
| 01010 | 10 | D | 11010 | 26 | — |
| 01011 | 11 |   | 11011 | 27 | — |
| 01100 | 12 | H | 11100 | 28 | — |
| 01101 | 13 | O | 11101 | 29 | — |
| 01110 | 14 | W | 11110 | 30 | — |

In MEM0 16, the letters "H" "E" "L" and "L" are stored at addresses 0 (00000) 16a, 1 (00001) 16b, 2 (00010) 16c and 3 (00011) 16d respectively. In MEM1 18, the letters "A", "R", "E", and " " are stored at addresses 16 (10000) 18a, 17 (10001) 18b, 18 (10010) 18c, and 19 (10011) 18d respectively. It should be noted in this example that the data stored in memory 16, 18 was too large to be contained completely in MEM0 16 and therefore, extends into MEM1 18.

Referring now to FIG. 3, the address space of MEM0 16 and MEM1 18 is depicted after the memory has been reconfigured using a two-way interleaving arrangement. In a two-way interleaving arrangement, contiguous memory blocks are distributed between two equal sized memory modules.

As may be seen in FIG. 3, contiguous memory cells, cells having adjacent addresses, are located alternately between MEM0 16 and MEM1 18 after interleaving is implemented. That is, address 0 is located in the first cell in MEM0 16 whereas address 1 is located in the first cell of MEM1 18. The address of each of the data cells in MEM0 16 and MEM1 18 under a second reconfigured addressing scheme, and the data which is stored in the each of cells after interleaving is complete are as follows (where C=Column Select, R=Row Select, b=Board Select):

| Bits    | Address | Data | Bits    | Address | Data |
|---------|---------|------|---------|---------|------|
| (RRCCb) |         |      | (RRCCb) |         |      |
| 00000   | 0       | H    | 10000   | 16      | R    |
| 00001   | 1       | A    | 10001   | 17      | —    |
| 00010   | 2       | E    | 10010   | 18      | L    |
| 00011   | 3       | R    | 10011   | 19      | —    |
| 00100   | 4       | L    | 10100   | 20      | D    |
| 00101   | 5       | E    | 10101   | 21      | —    |
| 00110   | 6       | L    | 10110   | 22      | —    |
| 00111   | 7       |      | 10111   | 23      | —    |
| 01000   | 8       | O    | 11000   | 24      | H    |
| 01001   | 9       | Y    | 11001   | 25      | —    |
| 01010   | 10      |      | 11010   | 26      | O    |
| 01011   | 11      | O    | 11011   | 27      | —    |
| 01100   | 12      | W    | 11100   | 28      | W    |
| 01101   | 13      | U    | 11101   | 29      | —    |
| 01110   | 14      | O    | 11110   | 30      | —    |
| 01111   | 15      | ?    | 11111   | 31      | —    |

Here, it can be seen that the data is "scattered" throughout the memory 16, 18 as a result of the reconfiguration. Although the data has not changed its physical location in MEM0 16 and MEM1 18, the data now has a different address associated with it. In MEM0 16, the letters "H" "E" "L" and "L" are stored at addresses 0 (00000) 16a, 2 (00010) 16b, 4 (00100) 16c and 6 (00110) 16d respectively. In MEM1 18, the letters "A", "R", "E", and " " are stored at addresses 1 (00001) 18a, 3 (00011) 18b, 5 (00101) 18c, and 7 (00111) 18d respectively. Before the data can be accessed, each piece of data must be "gathered" and placed into the memory cell which has an address under the second reconfiguration addressing scheme which corresponds to the address the data held in memory under the first addressing scheme, before the reconfiguration.

Referring now to FIG. 4, the data stored in MEM0 16 and MEM1 18 is depicted as it would appear after the data has been "gathered". As a result of the gathering, the data has been relocated to the cell which corresponds to the address the data held before reconfiguration. The address of each of the data cells in MEM0 16 and MEM1 18 and the data is stored in the cell after gathering is as follows (where C=Column Select, R=Row Select, b=Board Select):

| Bits    | Address | Data | Bits    | Address | Data |
|---------|---------|------|---------|---------|------|
| (RRCCb) |         |      | (RRCCb) |         |      |
| 00000   | 0       | H    | 10000   | 16      | A    |
| 00001   | 1       | E    | 10001   | 17      | R    |
| 00010   | 2       | L    | 10010   | 18      | E    |
| 00011   | 3       | L    | 10011   | 19      |      |
| 00100   | 4       | O    | 10100   | 20      | Y    |
| 00101   | 5       |      | 10101   | 21      | O    |
| 00110   | 6       | W    | 10110   | 22      | U    |
| 00111   | 7       | O    | 10111   | 23      | ?    |
| 01000   | 8       | R    | 11000   | 24      | —    |
| 01001   | 9       | L    | 11001   | 25      | —    |
| 01010   | 10      | D    | 11010   | 26      | —    |
| 01011   | 11      |      | 11011   | 27      | —    |
| 01100   | 12      | H    | 11100   | 28      | —    |
| 01101   | 13      | O    | 11101   | 29      | —    |
| 01110   | 14      | W    | 11110   | 30      | —    |
| 01111   | 15      |      | 11111   | 31      | —    |

As can be seen in FIG. 4, the data now resides at the same addresses it did before reconfiguration, even though those addresses now correspond to different physical locations on MEM0 16 and MEM1 18. The letters "H" "E" "L" and "L" are stored at addresses 0 (00000) 16a, 1 (00001) 18a, 2 (00010) 16b and 3 (00011) 18b respectively. Here however, the "H" and the first "L" are stored in MEM0 16 and the "E" and the second "L" are stored in MEM1 18. The letters "A", "R", "E", and " " are stored at addresses 16 (10000) 16a", 17 (10001) 18a", 18 (10010) 16b", and 19 (10011) 18b" respectively. Here, the "A" and the "E" are stored in MEM0 16 and the "R" and the " " are stored in MEM1 18.

Figure 5:
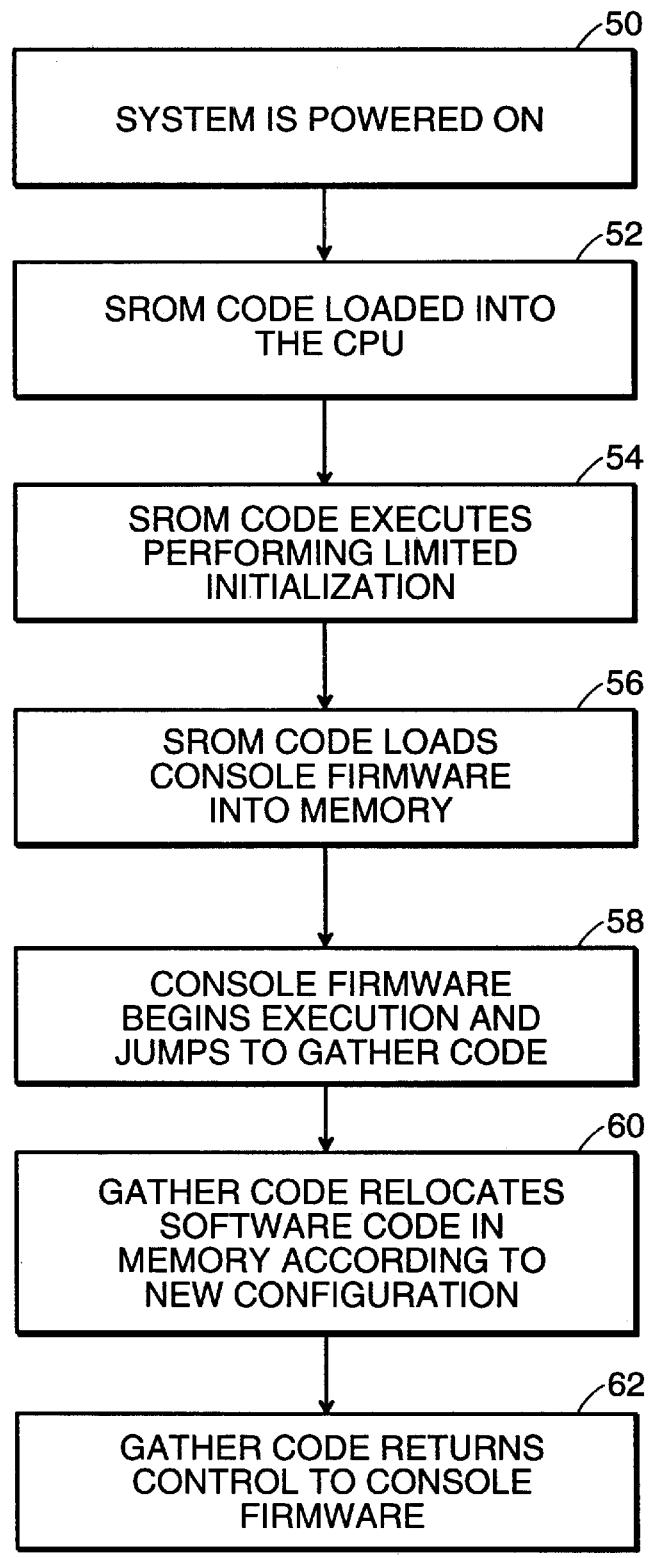
FIG. 5 is a flow chart depicting the steps performed during initialization of the computer system.

Referring now to FIG. 5, the initialization of the computer system 10 is shown to begin at step 50 when the computer system is powered on. After power-up, the SROM code 28 is loaded into the ICACHE 34 on the CPU 12 of the computer system 10 at step 52. From the ICACHE 34 of the computer system 10, the SROM code 28 executes at step 54.

While executing, the SROM code 28 initializes enough of the computer system at step 54, such that the console firmware 30 can be loaded into memory 16, 18 at step 56. Here, the SROM code 28 initializes MEM0 16 and loads the console firmware into MEM0 16. Once the console firmware 30 is loaded into MEM0 16, control is passed from the SROM code 28 to the console firmware 30.

The console firmware 30 begins to execute, jumping to the gather code 32 at step 58. The gather code 32 executes, reconfiguring the memory and relocating the console firmware 30 in memory 16, 18 in accordance with the reconfigured memory addresses at step 60. Once the gather code 32 completes relocating the console firmware 30, it transfers control back to the console firmware 30 at step 62, and completes the initialization and diagnostic testing of the computer system 10.

Figure 6:
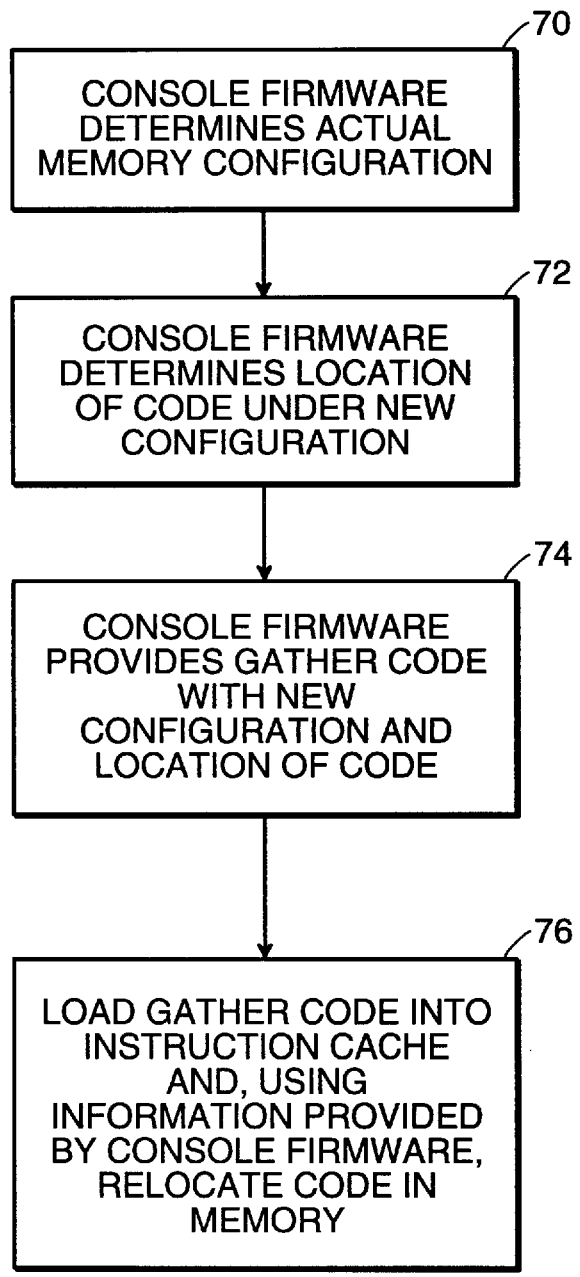
FIG. 6 is a flow chart depicting the steps performed during configuration of the system memory.

Referring now to FIG. 6, the configuration of the computer system 10 is shown to include the console firmware 30 determining the actual configuration of the memory 16, 18 at step 70. In addition to determining the actual memory configuration, the console firmware 30 also determines an offset of the console firmware 30 in the memory 16, 18 as a result of the reconfiguration from the address of its location in memory 16, 18 prior to the reconfiguration at step 72.

Reconfiguration of the memory system may be the result of different memory systems being available in the computer system 10. For example, the size of the memory board may be larger than what was initially assumed by the SROM code 28. Here, the row and column designations for the memory cells would be changed to take into account the additional memory cells available. In addition, multiple memory boards may be available and as a result memory interleaving may be implemented. In any of these cases, the data stored in the memory prior to the reconfiguration would be "scattered" throughout the memory as a result of the reconfiguration and it would be necessary to gather the data such that it could be accessed when required.

At step 74, the console firmware 30 provides the actual configuration and the offset location information to the gather code 32. At step 76 the gather code 32, using the information provided to it by the console firmware 30, relocates the console firmware 30 in memory 16, 18 such that it is no longer scattered throughout memory 16, 18 as a result of the memory reconfiguration, as will be discussed in detail below with reference to FIG. 7.

Figure 7:
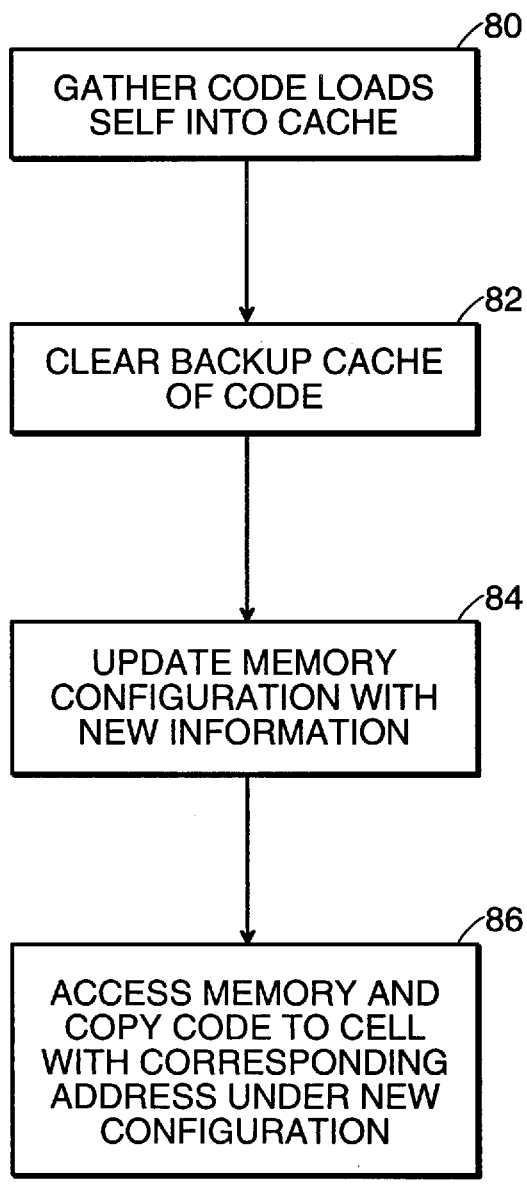
FIG. 7 is a flow chart depicting the steps performed by the gather code.

Referring now to FIG. 7, the gather code 32 loads itself into the ICACHE 34 at step 80. This is achieved by strategically locating branch statements in the gather code 32.

When instructions are loaded into an instruction cache, typically the instruction as well as X number of subsequent instructions, dependent upon the architecture on which the software is executing, are also loaded into the cache. Here, branch statements are located throughout the gather code 32 such that each branch statement is followed by an X number of subsequent instructions which will be the instructions which actually perform the gather. The branching condition is initially set to a value such that the gather code is not executed but rather the routine jumps to the subsequent branch statement. By jumping to subsequent branch statements, the gather code 32 is loaded into ICACHE 34 via the automatic loading of an instruction plus its subsequent X number of instructions. When the last instruction of the gather code 32 is loaded into ICACHE 34, the branching condition is set to a value such that the branches do not execute and the gather code 32 loops back to its beginning. During this second loop through the gather code 32, the intervening gather code instructions are executed and the gather is completed.

At step 82, the second loop through the gather code 32 begins by clearing the BCACHE 14 of data which is to be relocated. This step is performed to assure that the memory cells of MEM0 16 and MEM1 18 contain the latest valid data. At step 84, the gather code 32 reconfigures the memory 16, 18. This reconfiguration may be the result of implementing memory interleaving or adjustments made as a result of actual DRAM size of the memory 16, 18 (see FIG. 3 and FIG. 4 for memory interleaving example).

Once the reconfiguration is complete, the data which was loaded into memory, here the console firmware 30, is now scattered throughout the memory 16, 18. At step 86, MEM0 16 and MEM1 18 are accessed by the gather code 32 and the data is relocated under the second reconfiguration addressing scheme at the same address the data was located at in the first, pre-reconfiguration addressing scheme. To accomplish this, the gather code uses the offset value of the console firmware to determine where the actual console code is located under the new addressing scheme before the reconfiguration is implemented. This information is retained by the gather code and used later to relocate it to a location corresponding to the address the data held before the reconfiguration took place.

To relocate the data in one embodiment, the memory 16, 18 is accessed starting at the higher memory locations to protect against copying over data which will be needed later. Because data is typically loaded into memory beginning at the lower address locations, it is beneficial to begin copying the data into the higher, less seldomly used data cells.

Appendix A provides a computer listing of an example software routine which performs the steps described in conjunction with FIG. 7. In this example, the software assumes that the data to be preserved is initially contained in the first 4 MB of memory.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

PD95-0012
Buckingham et al.

Appendix A

```
;
;******************************************************************************
;
; Copyright (c) 1989, 1990, 1991, 1992, 1993, 1994, 1995
; by DIGITAL Equipment Corporation, Maynard, Mass.
;
;       The following function is used to configure memory
;       and gather the console
;       ---- marks the cache block boundries every cache block must be
;       touched the first time through the loop so all the code will
;       be in the icache.  If code is added be sure that a branch touches
;       every cache block.
;-

;       r17     - base address of where the console will be located after
;                 the configuration registers have been changed
;       r18     - the board size
;       r19     - increment of the console after the configuration registers
;                 have been changed.
;       r20     - array of values to write to the memory CSRs
        align_to_cache_block
config_mem:

lda     r1, 1(r31)

br      r31, 10$

1$:     bis     r31, r31, r1

; get the csr values from memory
        ldq/p   r21, 8*0(r20) ; get memory 0 csr3 value
        ldq/p   r22, 8*1(r20) ; get memory 1 csr3 value
        ldq/p   r23, 8*2(r20) ; get memory 2 csr3 value
        ldq/p   r24, 8*3(r20) ; get memory 3 csr3 value ; force the console out of the bcache. After this is done no access can
; be made to memory until the CSRs have been updated.
; The bcache cannot have a valid address in the first 4MB.
```

A1

PD95-0012
Buckingham et al.

```
        lda    r16, (r31)      ; read address 0
;----

10$:    bne    r1, 20$ lda    r20, 4(r31)     ; read 8MB = 256k cache blocks
        sll    r20, #16, r20

3$:     subq   r20, #1, r20    ; decr counter
        ldq/p  r0, (r16)       ; read location addq   r16, #32, r16   ; next cache block bne    r20, 3$         ; loop till done ;build the base csr value
        lda    r20, ^x388(r31) ;
;----

20$:    bne    r1, 30$ sll    r20, #^x18, r20 ; ^x388000000
        lda    r0, ^x60(r31)   ; configuration offset ^x60
        bis    r20, r0, r20    ; ^x388000060
        lda    r16, 1(r31)
        sll    r16, #^x18, r16 ; board offset ; write the csrs for the installed modules beq    r21, 11$        ; if it's zero then don't write the register
        stq/p  r21, (r20)      ; write the register
;----

30$:    bne    r1, 40$ mb

11$:    addq   r20, r16, r20   ; mem1 csr 3 address
        beq    r22, 21$        ; if it's zero then don't write the register
        stq/p  r22, (r20)      ; write the register
        mb
```

A2

PD95-0012
Buckingham et al.

```
21$:    addq   r20, r16, r20  ; mem2 csr 3 address
        beq    r23, 31$       ; if it's zero then don't write the register
;----

40$:    bne    r1, 50$ stq/p  r23, (r20)     ; write the register
        mb

31$:    addq   r20, r16, r20  ; mem3 csr 3 address
        beq    r24, 41$       ; if it's zero then don't write the register
        stq/p  r24, (r20)     ; write the register
        mb ; gather the console
41$:    lda    r16, (r31)     ; start at 0
;----

50$:    bne    r1, 60$ lda    r20, 4(r31)    ; copy 4MB
        sll    r20, #20 ,r20
;
; The console may be scattered after the the configuration change.
; For 1-way interleave
;       address 0x0  -> new_base_address + 0x0
;       address 0x20 -> new_base_address + 0x20
;       address 0x40 -> new_base_address + 0x40
;       address 0x60 -> new_base_address + 0x60
; For 2-way interleave
;       address 0x0  -> new_base_address + 0x0
;       address 0x20 -> new_base_address + board_size + 0x0
;       address 0x40 -> new_base_address + 0x40
;       address 0x60 -> new_base_address + board_size + 0x40
; For 4-way interleave
;       address 0x0  -> new_base_address + 0x0
;       address 0x20 -> new_base_address + board_size + 0x0
;       address 0x40 -> new_base_address + board_size*2 + 0x0
;       address 0x60 -> new_base_address + board_size*3 + 0x0
;       address 0x80 -> new_base_address + 0x80
;       address 0xa0 -> new_base_address + board_size   + 0x80
```

A3

PD95-0012
Buckingham et al.

```
;       address 0xc0 -> new_base_address + board_size*2 + 0x80
;       address 0xe0 -> new_base_address + board_size*3 + 0x80 addq    r17, r18, r25   ; new console base plus board size
        addq    r25, r18, r28   ; new console base plus 2*board size
        addq    r28, r18, r18   ; new console base plus 3*board size 51$:    ldq/p   r21, 8*0(r17)   ; read the scattered console qw 0
        ldq/p   r22, 8*1(r17)   ; read the scattered console qw 1
;----

60$:    bne     r1, 70$ ldq/p   r23, 8*2(r17)   ; read the scattered console qw 2
        ldq/p   r24, 8*3(r17)   ; read the scattered console qw 3 stq/p   r21, 8*0(r16)   ; write the gathered console qw 0
        stq/p   r22, 8*1(r16)   ; write the gathered console qw 1
        stq/p   r23, 8*2(r16)   ; write the gathered console qw 2
        stq/p   r24, 8*3(r16)   ; write the gathered console qw 3
        mb
;----

70$:    bne     r1, 80$ addq    r17, r19, r17 cmpeq   r19, #32, r0    ; check interleave 32 = 1-way
        bne     r0, 81$ addq    r16, #32, r16           ; point to the next cache block ldq/p   r21, 8*0(r25)   ; read the scattered console qw 0 ldq/p   r22, 8*1(r25)   ; read the scattered console qw 1
        ldq/p   r23, 8*2(r25)   ; read the scattered console qw 2
;----

80$:    bne     r1, 90$ ldq/p   r24, 8*3(r25)   ; read the scattered console qw 3
```

A4

PD95-0012
Buckingham et al.

```
        stq/p   r21, 8*0(r16) ; write the gathered console qw 0
        stq/p   r22, 8*1(r16) ; write the gathered console qw 1
        stq/p   r23, 8*2(r16) ; write the gathered console qw 2
        stq/p   r24, 8*3(r16) ; write the gathered console qw 3
        mb addq    r25, r19, r25
;----

90$:    bne     r1, 100$ cmpeq       r19, #64, r0  ; check interleave 64 = 2-way
        bne     r0, 81$            ; not 64? then must be 4-way addq    r16, #32, r16      ; point to the next cache block ldq/p   r21, 8*0(r28) ; read the scattered console qw 0
        ldq/p   r22, 8*1(r28) ; read the scattered console qw 1
        ldq/p   r23, 8*2(r28) ; read the scattered console qw 2
        ldq/p   r24, 8*3(r28) ; read the scattered console qw 3
;----

100$:   bne     r1, 110$ stq/p   r21, 8*0(r16) ; write the gathered console qw 0
        stq/p   r22, 8*1(r16) ; write the gathered console qw 1
        stq/p   r23, 8*2(r16) ; write the gathered console qw 2
        stq/p   r24, 8*3(r16) ; write the gathered console qw 3
        mb addq    r28, r19, r28
        addq    r16, #32, r16      ; point to the next cache block
;----

110$:   bne     r1, 120$ ldq/p   r21, 8*0(r18) ; read the scattered console qw 0
        ldq/p   r22, 8*1(r18) ; read the scattered console qw 1
        ldq/p   r23, 8*2(r18) ; read the scattered console qw 2
        ldq/p   r24, 8*3(r18) ; read the scattered console qw 3
```

PD95-0012
Buckingham et al.

```
        stq/p  r21, 8*0(r16) ; write the gathered console qw 0
        stq/p  r22, 8*1(r16) ; write the gathered console qw 1
        stq/p  r23, 8*2(r16) ; write the gathered console qw 2
;----

120$:   bne    r1, 130$ stq/p  r24, 8*3(r16) ; write the gathered console qw 3
        mb addq   r18, r19, r18

81$:    addq   r16, #32, r16     ; point to the next cache block
        cmplt  r16, r20, r0 bne    r0, 51$ bis    r31, r31, r31 ; keep aligned on cache block
;----

130$:   bne    r1, 1$
        hw_rei                   ; and return
;----
```

A6

What is claimed is:

1. A method for configuring a memory of a computer system, while maintaining data integrity, including the steps of:
   loading data into the memory using a first addressing scheme;
   determining an initial memory configuration of the computer system;
   reconfiguring the memory in accordance with said initial memory configuration providing a second memory addressing scheme;
   determining a location of said data using said second memory addressing scheme; and
   relocating said data in the memory at a location using said second addressing scheme corresponding to an address of the location of said data using said first addressing scheme.

2. A method for reconfiguring a memory of a computer system during initialization of the computer system, while maintaining software code stream coherency including the steps of:
   providing a limited initialization of the computer system including a first configuration of memory providing a first memory addressing scheme;
   loading console firmware into the memory of the computer system;
   executing said console firmware;
   loading gather code into an instruction cache of the computer system; and
   executing said gather code including the steps of:
      reconfiguring the memory in accordance with a second configuration of memory providing a second memory addressing scheme; and
      relocating said console firmware in the memory to a location using said second memory addressing scheme corresponding to an address of a location that said console firmware was stored at in the memory using said first memory addressing scheme.

3. The method of claim 2 wherein said step of loading said gather code includes the step of:
   executing in said instruction cache, in response to a boolean value of a branch condition, branch statements included at specific locations in said gather code causing gather instructions located proximately to said branch statements to be loaded into said instruction cache.

4. The method of claim 3 wherein said step of executing said gather code includes the steps of:
   setting said branch condition to an opposite boolean value; and
   executing said gather instructions in said instruction cache.

5. The method of claim 2 wherein said step of executing said console firmware further includes the steps of:
   determining a second, actual configuration of memory;
   determining an offset between an address of the location of said console firmware under said first addressing scheme and the address of the location of said console firmware in said second configuration of memory; and
   providing said offset and said second configuration of memory to said gather code.

6. The method of claim 5 wherein said step of executing said gather code further includes the step of:
   clearing a backup cache of the computer system of instructions associated with said console firmware.

7. A memory included in a computer system comprising:
   machine executable instructions for loading data into the memory using a first addressing scheme;
   machine executable instructions for determining an initial memory configuration of the computer system;
   machine executable instructions for reconfiguring the memory in accordance with said initial memory configuration providing a second memory addressing scheme;
   machine executable instructions for determining a location of said data using said second memory addressing scheme; and
   machine executable instructions for relocating said data in the memory at a location using said second addressing scheme corresponding to an address of the location of said data using said first addressing scheme.

8. A memory included in a computer system comprising:
   machine executable instructions for providing a limited initialization of the computer system including a first configuration of memory providing a first memory addressing scheme;
   machine executable instructions for loading console firmware into the memory of the computer system;
   machine executable instructions for executing said console firmware;
   machine executable instructions for loading gather code into an instruction cache of the computer system; and
   machine executable instructions for executing said gather code including:
      machine executable instructions for reconfiguring the memory in accordance with a second configuration of memory providing a second memory addressing scheme; and
      machine executable instructions for relocating said console firmware in the memory to a location using said second memory addressing scheme corresponding to an address of a location that said console firmware was stored at in the memory using said first memory addressing scheme.

9. The memory of claim 8 wherein said machine executable instructions for loading said gather code includes:
   machine executable instructions for executing in said instruction cache, in response to a boolean value of a branch condition, branch statements included at specific locations in said gather code causing gather instructions located proximately to said branch statements to be loaded into said instruction cache.

10. The memory of claim 9 wherein said machine executable instructions for executing said gather code includes:
    machine executable instructions for setting said branch condition to an opposite boolean value; and
    machine executable instructions for executing said gather instructions in said instruction cache.

11. The memory of claim 8 wherein said machine executable instructions for executing said console firmware further includes:
    machine executable instructions for determining a second, actual configuration of memory;

machine executable instructions for determining an offset between an address of the location of said console firmware under said first addressing scheme and the address of the location of said console firmware in said second configuration of memory; and machine executable instructions for providing said offset and said second configuration of memory to said gather code.

12. The memory of claim 11 wherein said machine executable instructions for executing said gather code further includes:

machine executable instructions for clearing a backup cache of the computer system of instructions associated with said console firmware.

* * * * *